United States Patent
Wang et al.

(10) Patent No.: US 12,487,182 B2
(45) Date of Patent: Dec. 2, 2025

(54) NON-INTRUSIVE METHOD FOR 2D/3D MAPPING PLASMA PARAMETERS

(71) Applicant: Tokyo Electron Limited, Tokyo (JP)

(72) Inventors: Qiang Wang, Austin, TX (US); Zhiying Chen, Austin, TX (US); Peter Lowell George Ventzek, Austin, TX (US)

(73) Assignee: Tokyo Electron Limited, Tokyo (JP)

( * ) Notice: Subject to any disclaimer, the term of this patent is extended or adjusted under 35 U.S.C. 154(b) by 244 days.

(21) Appl. No.: 18/313,958

(22) Filed: May 8, 2023

(65) Prior Publication Data
US 2024/0377331 A1    Nov. 14, 2024

(51) Int. Cl.
*G01N 21/73* (2006.01)
*G01J 3/443* (2006.01)
(Continued)

(52) U.S. Cl.
CPC .............. *G01N 21/73* (2013.01); *G01J 3/443* (2013.01); *H01J 37/32926* (2013.01);
(Continued)

(58) Field of Classification Search
CPC .......... G01N 21/73; G01N 1/00; G01N 21/31; G01N 2201/10; G01N 2021/1787;
(Continued)

(56) References Cited

U.S. PATENT DOCUMENTS

| 6,958,484 B2 | 10/2005 | Mitrovic |
| 9,406,485 B1 * | 8/2016 | Cheng ............... H01J 37/32091 |

(Continued)

FOREIGN PATENT DOCUMENTS

| WO | WO-2020092236 A1 * | 5/2020 | ............... H05H 1/30 |
| WO | WO-2024118852 A1 * | 6/2024 | ........ H01J 37/32981 |
| WO | WO-2024123632 A2 * | 6/2024 | ........ H01J 37/32862 |

OTHER PUBLICATIONS

Malyshev et al. (Diagnostics of chlorine inductively coupled plasmas. Measurement of electron temperatures and electron energy distribution functions, J. Appl. Phys. 87, 1642-1649 (2000).*

(Continued)

*Primary Examiner* — Mohamed K Amara
(74) *Attorney, Agent, or Firm* — Slater Matsil, LLP (57) ABSTRACT

A method of characterizing a plasma in a plasma processing chamber that includes: sustaining a plasma generated from a process gas in a plasma processing chamber; flowing a probe gas through the plasma processing chamber; obtaining spatially-resolved OES signals at a wavelength of an optical emission line of the probe gas within the plasma processing chamber, signal intensities of the spatially-resolved OES signals being correlated to a plasma parameter of the plasma, the plasma parameter having a spatial distribution within the plasma processing chamber; and based on the spatially-resolved OES signals, constructing a 3D map of OES signals by data fitting of the spatially-resolved OES signals with a computation model; and converting the 3D map of OES signals into a 3D map of the plasma parameter, the 3D map of the plasma parameter including information about the spatial distribution.

20 Claims, 9 Drawing Sheets

(51) Int. Cl.
*H01J 37/32* (2006.01)
*H01L 21/66* (2006.01)

(52) U.S. Cl.
CPC .. *H01J 37/32954* (2013.01); *H01J 37/32963* (2013.01); *H01J 37/32981* (2013.01); *H01J 2237/3341* (2013.01); *H01L 22/20* (2013.01)

(58) Field of Classification Search
CPC ............. G01N 2021/625; G01N 21/71; G01N 2201/1293; G01J 3/443; G01J 3/30; H01J 37/32926; H01J 37/32954; H01J 37/32963; H01J 37/32981; H01J 2237/3341; H01J 37/32972; H01J 2237/334; H01J 37/32935; H01J 37/32422; H01L 22/20; H01L 21/3065; H01L 21/67069; G06T 11/003
See application file for complete search history.

(56) References Cited

U.S. PATENT DOCUMENTS

| | | | |
|---|---|---|---|
| 9,970,818 B2 | 5/2018 | Bao et al. | |
| 10,215,704 B2 | 2/2019 | Han et al. | |
| 10,267,728 B2 | 4/2019 | Yang et al. | |
| 10,473,525 B2 | 11/2019 | Meng et al. | |
| 2010/0038653 A1* | 2/2010 | Scarsbrook | H10D 62/405 438/105 |
| 2018/0218881 A1* | 8/2018 | Brandon | H01J 37/32201 |
| 2018/0220520 A1* | 8/2018 | Alavi | G01J 3/443 |
| 2019/0064075 A1* | 2/2019 | Marchuk | G01N 21/71 |

OTHER PUBLICATIONS

Bonheure et al., "2-D Spatial Distribution of D-D and D-T Neutron Emission in JET ELMy H-mode Plasmas with Tritium Puff," Proceedings of the EPS Conference, Tarragona, Spain, Jun. 27-Jul. 1, 2005, 10 pages.
Chen et al., "Measurement of electron temperatures and electron energy distribution functions in dual frequency capacitively coupled CF4/02 plasmas using trace rare gases optical emission spectroscopy," J. Vac. Sci. Technol. A, vol. 27, No. 5, pp. 1159-1165, Jul. 31, 2009, 7 pages.
David et al., "Characterisation of coherent rotating modes in a magnetised plasma col. using a mono-sensor tomography diagnostic," HAL Id: hal-01344867 https://hal.archives-ouvertes.fr/hal-01344867, Jul. 12, 2016, 7 pages.
David et al., "A tomography diagnostic in the visible spectrum to investigate turbulence and coherent modes in the inear plasma column Mistral," HAL Id: hal-01570062, https://hal.archives-ouvertes.fr/hal-01570062, Jul. 28, 2017, 8 pages.
Donnelly et al., "Trace Rare Gases Optical Emission Spectroscopy for Determination of Electron Temperatures and Species Concentrations in Chlorine-Containing Plasmas," Japanese Journal of Applied Physics. vol. 37, pp. 2388-2393, Part 1, No. 4B, Jan. 20, 1998, 7 pages.
Donnelly et al., "Plasma electron temperatures and electron energy distributions measured by trace rare gases optical emission spectroscopy," Journal of Physics D: Applied Physics, vol. 37, No. 19, Sep. 15, 2004, 5 pages.
Fujisawa et al., "Tomography as a Diagnostic Tool for Plasma Turbulence," 43rd EPS Conference on Plasma Physics, O5.J305, Jul. 4, 2016, 4 pages.
Fuller et al., "Characterization of transformer coupled oxygen plasmas by trace rare gase-optical emission spectroscopy and Langmuir probe analysis," Plasma Sources Sci. Technol., vol. 9, pp. 116-127, Jan. 18, 2000, 12 pages.
Gonzalez-Fernandez et al., "Spatially resolved determination of the electronic density and temperature by a visible spectrotomography diagnostic in a linear magnetized plasma," www.nature.com/scientificreports/, Mar. 25, 2020, 12 pages.
Wang, (2006). Plasma diagnostics and modeling of direct current microplasma discharges at atmospheric pressure, Thesis (Ph. D.)—University of Houston, 2006.
Selwyn, G., "Optical Diagnostic Tehniques for Plasma Processing," AVS Monograph Series, Jan. 1, 1993, 34 pages.
Tanaka et al., "Spatial profile monitoring of etch products of silicon in HBr/C12/02 /Ar plasma," Journal of Vacuum Science and Technology A, vol. 25, No. 2, pp. 353-359, Feb. 28, 2007, 8 pages.
Wang et al., "Experimental and theoretical study of the effect of gas flow on gas temperature in an atmospheric pressure microplasma," Journal of Physics D: Applied Physics, vol. 40, pp. 4202-4211, doi:10.1088/0022-3727/40/14/015, Jun. 29, 2007, 10 pages.

* cited by examiner

NON-INTRUSIVE METHOD FOR 2D/3D MAPPING PLASMA PARAMETERS

TECHNICAL FIELD

The present invention relates generally to a system and method of plasma characterization, and, in particular embodiments, to non-intrusive 2D/3D mapping of plasma parameters.

BACKGROUND

Generally, a semiconductor device, such as an integrated circuit (IC) is fabricated by sequentially depositing and patterning layers of dielectric, conductive, and semiconductor materials over a substrate to form a network of electronic components and interconnect elements (e.g., transistors, resistors, capacitors, metal lines, contacts, and vias) integrated in a monolithic structure. Process flows used to form the constituent structures of semiconductor devices often involve depositing and removing a variety of materials while a pattern of several materials may be exposed in a surface of the working substrate.

Advanced process control that involves process and system characterization and fault detection in semiconductor manufacturing is essential for reproducible production of complex structures. Especially in high-volume manufacturing, plasma system diagnosis is of paramount importance for process consistency. As the minimum dimension of features in a patterned layer has shrunk periodically and new materials have been introduced in ICs, the need for improved plasma system diagnosis to assure process compliance and cost reduction has increased.

SUMMARY

In accordance with an embodiment of the present invention, a method of characterizing a plasma in a plasma processing chamber that includes: sustaining a plasma generated from a process gas in a plasma processing chamber of a plasma processing system, the plasma processing including a plasma optical emission spectroscopy (OES) system configured to measure optical emissions from the plasma, the plasma processing chamber configured to hold and plasma process a substrate; flowing a probe gas through the plasma processing chamber; obtaining spatially-resolved OES signals at a wavelength of an optical emission line of the probe gas within the plasma processing chamber, signal intensities of the spatially-resolved OES signals being correlated to a plasma parameter of the plasma, the plasma parameter having a spatial distribution within the plasma processing chamber; and based on the spatially-resolved OES signals, constructing a three-dimensional (3D) map of OES signals by data fitting of the spatially-resolved OES signals with a computation model; and converting the 3D map of OES signals into a 3D map of the plasma parameter, the 3D map of the plasma parameter including information about the spatial distribution.

In accordance with an embodiment of the present invention, a method of characterizing a plasma in a plasma processing chamber that includes: sustaining a plasma generated from a process gas in a plasma processing chamber, the plasma processing chamber connected a plasma optical emission spectroscopy (OES) system, the plasma processing chamber configured to hold and plasma process a substrate; flowing a probe gas to the plasma processing chamber; obtaining a set of spatially-resolved OES data from the plasma using the plasma OES system, each OES data including an OES spectrum of the probe gas, the OES spectrum correlated to a plasma parameter of the plasma; obtaining a set of spatially-resolved values of the plasma parameter that correspond to the set of spatially-resolved OES data, the obtaining of the set of spatially-resolved values of the plasma parameter including correlating the OES spectrum in each OES data with a model OES spectrum.

In accordance with an embodiment of the present invention, a method of processing a substrate, the method including: plasma processing a substrate in a plasma processing chamber by exposing the substrate to a plasma generated from a process gas, the plasma processing chamber being mechanically connected to a plasma optical emission spectroscope (OES); during the plasma processing, flowing a probe gas through the plasma processing chamber; performing a first scan across the plasma processing chamber to obtain a first series of OES spectra from a first series of rays that concentrically share a first pivot point; performing a second scan across the plasma processing chamber to obtain a second series of OES spectra from a second series of rays that concentrically share a second pivot point; based on the first and second series of OES spectra, obtaining a set of spatially-resolved OES intensity data from an optical emission line of the probe gas in the plasma, the OES intensity data correlated to a plasma parameter of the plasma; and based on the set of spatially-resolved OES intensity data, calculating a spatial distribution of the plasma parameter within the plasma processing chamber.

BRIEF DESCRIPTION OF THE DRAWINGS

For a more complete understanding of the present invention, and the advantages thereof, reference is now made to the following descriptions taken in conjunction with the accompanying drawings, in which:

FIGS. 6A-6C illustrate top views of an example substrate at various stages of a two-dimensional (2D) plasma parameter mapping process in accordance with various embodiments, wherein FIG. 6C illustrates a 2D map of a plasma parameter;

FIGS. 7A-7B illustrate two methods of three-dimensional (3D) plasma OES measurement using two optical systems, wherein FIG. 7A illustrates a method of vertical shifting of the two optical systems, and wherein

FIGS. 8A-8C illustrate perspective views of an example substrate at various stages of a 3D plasma parameter mapping process in accordance with various embodiments, wherein FIG. 8C illustrates a 3D map of a plasma parameter; and FIGS. 9A-9C illustrate process flow charts of methods of plasma parameter mapping process with spatially-resolved OES measurements in accordance with various embodiments, wherein FIG. 9A illustrates an embodiment.

DETAILED DESCRIPTION OF ILLUSTRATIVE EMBODIMENTS

This application relates to systems and methods of plasma characterization, more particularly to non-intrusive two- or three-dimensional (2D/3D) mapping of plasma parameters. In semiconductor manufacturing, plasma processing is used at various stages for depositing and etching various materials to construct complex structures with precision at nanometer scale. Because a plasma is a highly energetic and complex system comprising ion and radical species, it is often challenging to accurately characterize the plasma during operation and monitor the progress of a plasma process. In particular, as the semiconductor technology roadmap continues to move to 2 nm node and beyond, it is now highly desired to obtain and further improve the spatial resolution of plasma parameters (e.g., electron temperature, ion fluxes, gas temperature, etc.) in plasma processing for advanced 3D features. The existing metrology for plasma characterization, such as Langmuir probe and Wise-probe, is usually an intrusive technique and can disturb the plasma. In addition, its spatial resolution may be limited. Optical emission spectroscopy (OES) is a powerful non-intrusive spectroscopic tool to analyze atoms and ions present in a plasma by detecting optical emission from excited species. Spatial distribution of OES signals across a substrate may be obtained by OES measurements in combination with tomographic techniques. However, these techniques are limited to chemical species analysis, and thus further improvement of OES techniques is needed to be able to characterize spatial distributions of various other plasma parameters.

Embodiments of the present application disclose improved systems and methods of 2D/3D mapping of plasma parameters using spatially-resolved OES data. The spatially-resolved OES data refers to location-specific OES data that contains the location information of point of OES signal generation from the plasma in a plasma processing chamber. In various embodiments, a small amount of a probe gas (e.g., noble gas, $N_2$, $H_2$, etc.) may be added to the plasma and used for OES measurements. Spatial resolution of the OES is enabled by the tomography of optical light emission from the probe gas, and estimation of various plasma parameters is enabled by actinometry technique. The plasma parameters that may be calculated based on actinometry models may include, but are not limited to, electron temperature ($T_e$), neutral (gas) temperature, electron energy distribution, and sheath electrical field. These spatially-resolved plasma parameters may be mapped in 2D or 3D. Further, various embodiments of the methods may advantageously measure and monitor time-resolved light intensities from the plasma at different wavelengths, and therefore time-resolved 2D/3D mapping of plasma parameters may be obtained without disturbing the plasma. This non-intrusive plasma characterization technique based on spatially-resolved OES measurements may particularly be useful in plasma reactor improvement and in-situ process parameter monitoring and optimization.

In the following, an example plasma processing system equipped with an optical emission spectroscopy (OES) measurement system in accordance with various embodiments is described referring to FIGS. 1-2. Examples of an optical system for the OES measurement system that enables spatially-resolved OES are described referring to FIGS. 3-4. In FIG. 5, an exemplary 2D distribution of plasma optical emission is then described. Subsequently, 2D or 3D plasma parameter mapping based on the spatially-resolved OES is described referring to FIGS. 6A-6C, 7A-7B, and 8A-8C. Example process flow charts of methods of plasma parameter mapping process with spatially-resolved OES measurements are illustrated in FIGS. 9A-9C. All figures in this disclosure are drawn for illustration purpose only and not to scale, including the aspect ratios of features.

Figure 1:
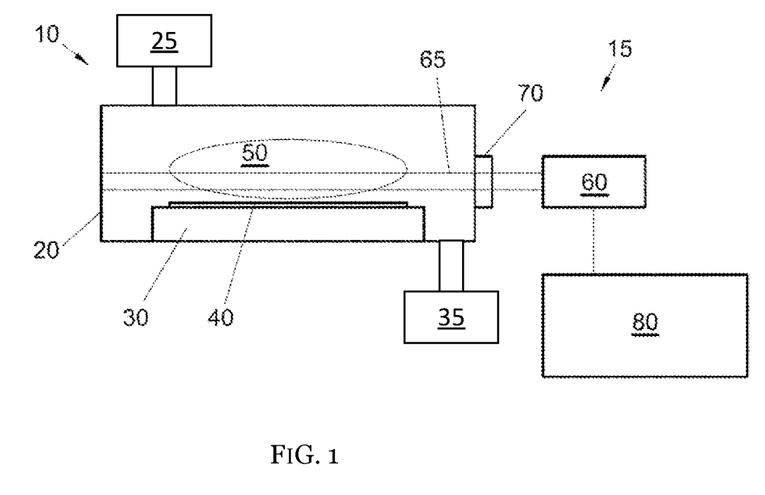
FIG. 1 illustrates a schematic side view of a plasma processing system equipped with an optical emission spectroscopy (OES) measurement system in accordance with an embodiment.

FIG. 1 illustrates a schematic side view of a plasma processing system 10 equipped with an optical emission spectroscopy (OES) measurement system 15 in accordance with an embodiment.

Figure 2:
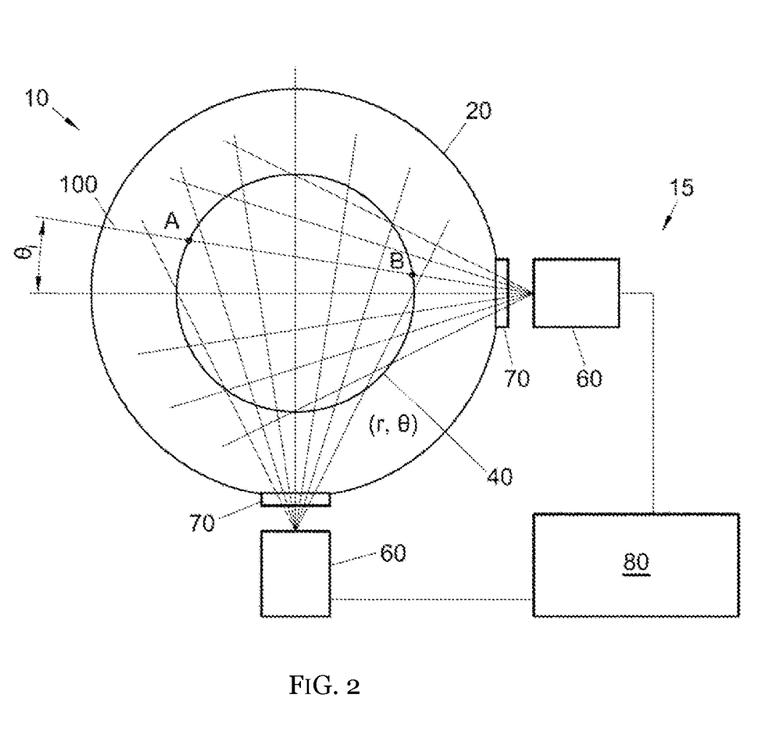
FIG. 2 schematically illustrates a schematic top view of a plasma processing system equipped with an OES measurement system in accordance with an embodiment.

FIG. 2 schematically illustrates a schematic top view of the plasma processing system 10 equipped with the OES measurement system 15 in accordance with an embodiment.

FIG. 1 illustrates an embodiment of a plasma processing system 10 equipped with an OES measurement system 15. The plasma processing system 10 comprises a plasma processing chamber 20, inside which a substrate holder 30 is disposed, such as an electrostatic chuck, for receiving a substrate 40 to be processed. Radio frequency (RF) and/or microwave power is supplied to the plasma processing chamber 20 (not shown) to ignite and sustain a plasma 50 proximate the substrate 40, wherein the energetic chemical species from the plasma 50 are used to perform a plasma processing step on the substrate 40. Process gases are flown into the plasma processing chamber 20 by a gas delivery system 25 and a pumping system 35 is configured to maintain a vacuum in the plasma processing chamber 20, at a desired process pressure. Examples of plasma processing steps include plasma etching, plasma-enhanced chemical vapor deposition (PECVD), plasma-enhanced atomic layer deposition (PEALD), etc. The system and method described herein are applicable to any kind of plasma processing.

In various embodiments, the OES measurement system 15 is used to acquire plasma optical emission spectra via at least one optical detector 60, which communicates the acquired plasma optical emission spectra to and is controlled by an OES controller 80. The OES controller 80 may be a general purpose computer, and may be located proximate to plasma processing system 10, or may be located remotely, and connected via an intranet or internet connection to the optical detector 60.

The optical detector 60 may comprise optics configured in such a way that it collects plasma optical emissions from an elongated, generally a pencil-shaped volume of space within the plasma 50. Optical access to the plasma processing chamber is provided by optical window 70. Optical window 70 can comprise a transparent material such as glass, quartz, fused silica, or sapphire, depending on the application and how aggressive the chemistry of the plasma 50 is. A ray of light 65 (referred to as ray 65) defines the portion of space from which the plasma optical emission spectra are collected, and the collected spectra represent an integral of contributions to the collected plasma optical emission spectrum from all points located along and within the ray 65. The ray 65 may comprise light of any range of wavelength, including optical emissions from the plasma 50. It should be noted that depending on the geometry and configuration of optical detector 60, the contributions of each point within the ray 65 will not be equal, but are weighted and governed by the optical efficiency. In various embodiments, the ray 65 is oriented substantially parallel with a major surface (i.e., top surface) of substrate 40 and is maintained at a small distance from the surface of substrate 40, so as to reduce optical interference from the substrate surface, yet is kept close enough to the substrate 40 to sample the plasma chemistry proximate the substrate surface. In certain embodiments, the ray 65 may be positioned such that an optical emission from a sheath region of the plasma 50. In another embodiment, as further described later, the OES methods may further comprise vertically shifting the position of the ray 65 to collect OES signals from the plasma at different heights.

In certain embodiments, the OES controller 80 may not only control the OES measurement system 15 but also compute the (1) plasma optical intensity distribution as a function of spatial location and wavelength, and to compute (2) the spatial distribution of various plasma parameters (e.g., electron temperature) from the computed plasma optical intensity distribution. This information can then be used for process development, plasma processing tool development, in-situ plasma process monitoring, plasma process fault detection, and plasma process endpoint detection among others. Accordingly, in certain embodiments, the OES controller 80 may be connected to a controller of the plasma power source to enable such dynamic plasma control.

In various embodiments, although not specifically illustrated, the OES controller 80 of the OES measurement system 15 may comprise various electrical components required to perform detection, recording, analysis of the OES signals as well as feedback control of the plasma processing system 10 and the OES measurement system 15. Such components may include a transceiver, an amplifier, an analog-to-digital convertor (ADC), a filter, a memory, and a processor. In various embodiments, the OES measurement system 15 may be configured to perform a series of operations according to a command from the OES controller 80: OES data acquisition at the optical detector 60, receiving the OES data at the transceiver, filtering the OES data at the filter, and determining a characteristic of the plasma at the processor. In certain embodiments, the OES measurement system 15 may be further configured to process the obtained raw OES data by, for example, averaging and/or smoothing prior to further processing the data for 2D/3D mapping.

In acquiring the OES data, the optical detector 60 may include, for example, a spectrometer that samples an optical emission spectrum of a plasma. The spectrum, in this example, may include light intensity as a function of wavelength or frequency. The optical detector 60 may comprise a charge-coupled device (CCD) sensor, a complementary metal oxide semiconductor (CMOS) image sensor, or other type of light detection device or photosensor may be utilized to measure the light intensity at a plasma processing chamber of the plasma processing system 10. In certain embodiments, the sensor of the optical detector 60 may comprise a CCD sensor with a capability of millisecond time resolution. In another embodiment, the sensor may comprise a CMOS image sensor with a capability of microsecond time resolution.

Although only one ray (the ray 65) traversing the plasma 50 located within the plasma processing chamber 20 is illustrated in FIG. 1, in various embodiments, multiple rays 100 can be used to sample the plasma optical emission spectra, as shown in FIG. 2, which shows the top schematic view of the plasma processing system 10 of FIG. 1. In the exemplary embodiment of FIG. 2, two optical detectors 60 are used to collect plasma optical emission spectra, each from 7 rays 100. Having multiple center points for OES measurements, for example by the two optical detectors 60 of FIG. 2, may advantageously enable spatially resolving the OES signals. In certain embodiments, the rays 100 may be non-coincident to each other such that the largest amount of spatial information is acquired from the plasma 50 above the substrate 40. In one embodiment, the number of rays 100 per the optical detector 60 can vary from 2 to 9, but it may be higher in another embodiment. In yet another embodiment, where optical access is provided to the plasma processing chamber 20 by only a single optical window 70, a single optical detector 60 can be used with its associated fan of rays 100. Alternatively, a third or more optical detectors, each with an associated ray fan, may be used. The angle of each ray 100 is defined with respect to the centerline of its optical detector 60, as $\theta_i$. Every point within the plasma processing chamber can be defined by its polar coordinates, i.e., $(r,\theta)$, as shown in FIG. 2.

In various embodiments, the OES from the associated fan of rays 100 can be acquired sequentially along the rays 100 associated with each optical detector 60. Such a data collection is enabled by a scanning approach, where the OES data are collected as the ray 100 is scanned from one angle $\theta_i$ to another. Understandably, this scanning and acquisition needs to occur fast enough such that rapid changes in the plasma chemistry can be detected across the entire substrate, including typical RF power pulsing conditions (e.g., 0.1 kHz to 100 kHz).

Alternately, in other embodiments, all OES from the associated fan of rays 100 may be collected simultaneously. This is suitable for embodiments of the optical detector 60 with multiple optical systems and channels, allowing simultaneous data collection from all of the rays 100.

Figure 3:
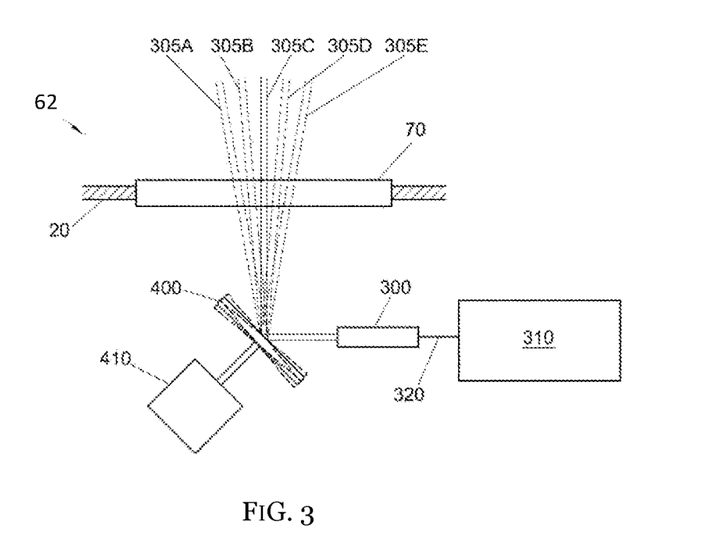
FIG. 3 illustrates an optical mirror system for use in an OES measurement system in accordance with an embodiment.

FIG. 3 illustrates an optical mirror system 62 for use in an OES measurement system in accordance with an embodiment. For illustration purpose, only one optical mirror system is illustrated in FIG. 3, but in various embodiments, the OES measurement system may comprise two or more optical mirror systems for 2D/3D mapping of OES data and plasma parameters.

In FIG. 3, an optical mirror system 62 may be used for an OES measurement system, where a single channel spectrometer 310 is used. In various embodiments, rays 305A-E may be formed by a scanning mirror 400 which may be controllably scanned to sweep out the rays 305A-E while OES data are acquired by the spectrometer 310 via a single optical system 300, such as a telecentric coupler. This embodiment with a mirror system may be suitable for sequential OES collection, and may be suited for diagnostics of slower-evolving plasma processes. In various embodiments, the scanning mechanism of the OES measurement system (e.g., the scanning mirror 400) may be configured to scan at a time scale between 1 ms and 100 ms. The scanning mirror 400 can be mounted and actuated by a galvanometer stage 410. Alternatively, the scanning mirror 400 may be mounted on and scanned by a stepper motor 410. The number of rays 305A-E here is shown as 5, but in practice it is determined by the settings in the controller software for controlling the galvanometer stage or stepper motor 410.

To ensure that a precise volume of space is sampled, the optical system 300 of FIG. 3 need to be configured such that the rays 305A-E are collimated, with as small a divergence angle as can feasibly be achieved for a given target cost of the optical system.

Figure 4:
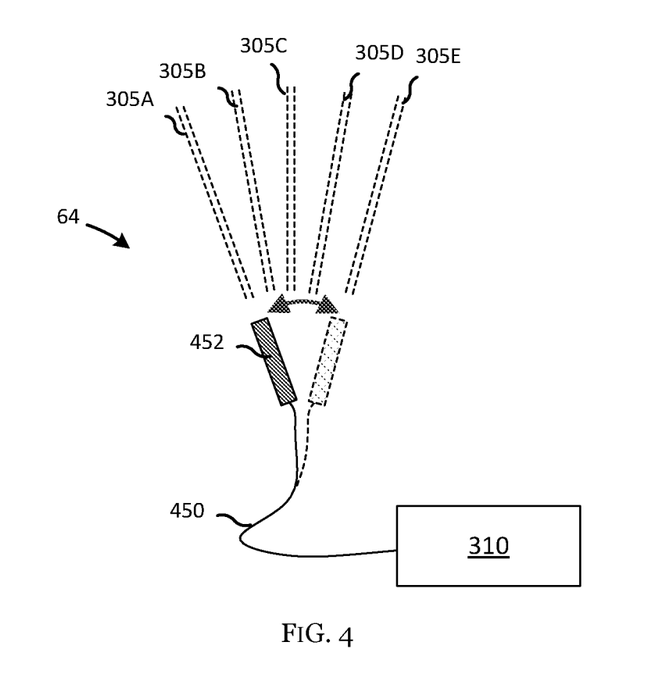
FIG. 4 illustrates an optical fiber system for use in an OES measurement system in accordance with an embodiment.
Figure 5:
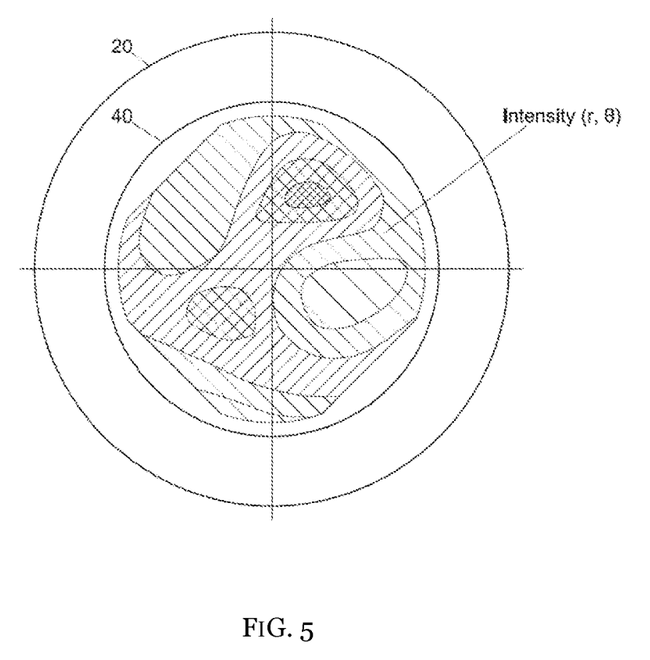
FIG. 5 illustrates an exemplary 2D distribution of plasma optical emission measured using an OES measurement system and associated method in accordance with an embodiment.

FIG. 4 illustrates an optical fiber system 64 for use in an OES measurement system in accordance with an embodiment. For illustration purpose, only one optical fiber system is illustrated in FIG. 4, but in various embodiments, the OES measurement system may comprise two or more optical fiber systems for 2D/3D mapping of OES data and plasma parameters In alternate embodiments, in place of an optical mirror system as illustrated in FIG. 3, an optical fiber system may be used. As illustrated in FIG. 4, an optical fiber 450 with a movable measurement head 452 may be connected to a single channel spectrometer 310. The movable measurement head 452 may be controllably scanned to sweep out rays 305A-E while OES data are acquired by the spectrometer 310.

In one or more embodiments, the movable measurement head 452 may comprise an optical system such as a telecentric coupler configured to collect OES signals from a volume of space within the plasma defined by the rays 305A-E so that it can be transmitted to the spectrometers 310. In certain embodiments, the diameter of the rays 305A-E may be about 4.5 mm but it can vary from about 1 mm to 20 mm, depending on the application. The telecentric coupler may comprise an optical aperture, one or more collection lenses, and one or more coupling lenses, and may be connected to the main body of the optical fiber 450. In one or more embodiments, the optical system comprising the measurement head 452 may be configured to operate satisfactorily over a large range of wavelengths, typically from 200 nm to 800 nm, but in some cases going as low as 150 nm. For better performance in the ultraviolet (UV) part of the spectrum, i.e., 350 nm and less, UV-grade materials may be used for all optical components of the optical system.

For every optical hardware configuration, it is important to know the optical efficiency with which is a weighting factor that applies to all points within the rays 305A-E from which plasma optical emission spectra are acquired. The optical efficiency w can be determined by simulation, using optical design software, or by experiment using calibrated light sources and moving them across and along the rays 305A-E to determine the efficiency of coupling of light from a given location within a ray 305A-E to the optical fiber end 390. The optical efficiencies w will be used in the algorithm for determining the spatial distribution of plasma optical emissions.

In various embodiments illustrated in FIGS. 3 and 4, the OES measurement system comprise at least one scanning part (e.g., the scanning mirror 400 in FIG. 3 or the movable measurement head 452 in FIG. 4). In other embodiments, it is also possible to use an OES measurement system without such features. For example, the OES measurement system may comprise a single multi-channel spectrometer and multiple optical systems (e.g., telecentric couplers) that can simultaneously collect OES data from multiple rays simultaneously. Multiple optical fibers may be used to transmit multiple OES data captured by the multiple optical systems. Such an embodiment may be suitable for fast diagnostics, because of its ability to collect multiple OES data simultaneously.

In the following, the mathematical procedures for determining 2D OES intensity spatial distribution based on tomography for each of M measured wavelengths λ are described in accordance with various embodiments. For each ray 100 of FIG. 2, the ray being denoted mathematically by an index i, the collected optical detector output $D_i$ can be defined as $$D_i = \int_{l_{AB}} I(r, \theta) w(r, \theta) dl$$

where $I(r,\theta)$ is the plasma optical emission intensity at a location $(r,\theta)$ within and along the ray 100, and $w(r,\theta)$ is the optical efficiency for collection of light from location $(r,\theta)$ by optical detector i. The resultant optical detector output $D_i$ represents an integral of the product of these quantities along a straight path from point A to point B on the circumference of the substrate 40, the contributions from plasma outside the circumference of the substrate 40 being neglected in this model. This is a valid assumption because the plasma density and thus plasma light emission is generally low in these areas.

In a plasma OES system with N optical detectors and rays, or alternatively N scanned positions of rays 100, there are N collected intensities for each of M measured wavelengths λ. Therefore, to reconstruct a spatial distribution of plasma optical emission at one wavelength λ, a functional form with N parameters has to be assumed. Given the restricted number N of parameters, a judicious choice of basis functions for the distribution of plasma optical emission needs to be made. The selected basis functions need to vary both with radial coordinate r, and also the circumferential coordinate θ for them to be able to reproduce satisfactorily the circumferential variations of plasma emission across the substrate 40. In various embodiments, Zernike polynomials may be used for the basis functions.

FIG. 5 illustrates an exemplary 2D distribution of plasma optical emission measured using an OES measurement system and associated method in accordance with an embodiment.

FIG. 5 shows an example of one such plasma optical emission intensity distribution determined with the method in accordance with an embodiment. The depicted distribution clearly shows good capture of both radial and circumferential variations in the plasma optical emission intensity, despite a relatively low number of terms, i.e., N=18.

In various embodiments, the spatially-resolved OES intensity data obtained as described above may advantageously be used for (2D/3D) mapping of plasma parameters by an actinometry technique with a trace amount of probe gas as described below.

Figure 6A:
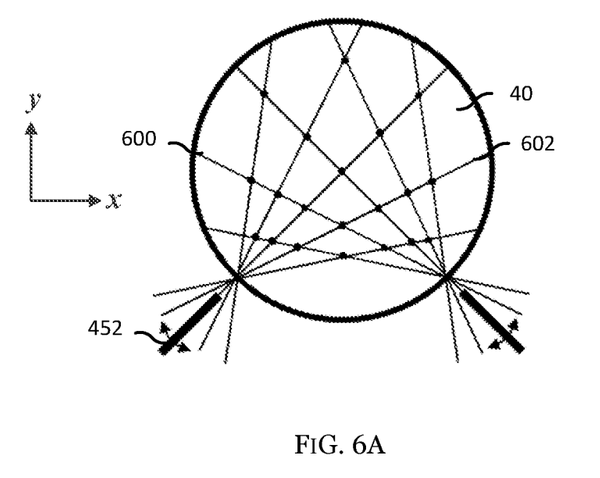
FIG. 6A illustrates two OES scans using two optical systems.
Figure 6B:
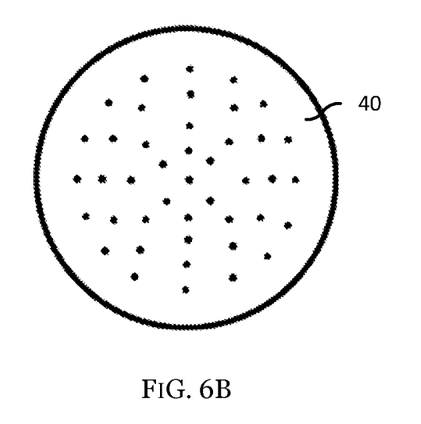
FIG. 6B illustrates spatially-resolved OES data points.
Figure 6C:
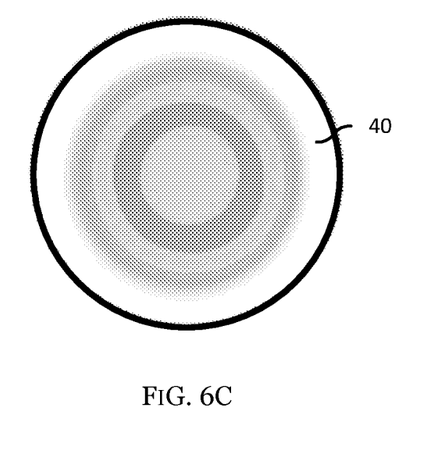

FIGS. 6A-6C illustrate top views of an example substrate at various stages of a two-dimensional (2D) plasma parameter mapping process in accordance with various embodiments. FIG. 6A illustrates two OES scans using two optical systems, FIG. 6B illustrates spatially-resolved OES data points, and FIG. 5C illustrates a 2D map of a plasma parameter.

In FIG. 6A, similar to the prior embodiments illustrated in FIG. 4, two measurement heads 452 connected to optical fibers can be scanned to sweep out rays 600 and 602 for collecting OES data across a plasma in a plasma processing chamber. In this example, the scans are performed such that the rays 600 and 602, and thereby all of their intersections are on a plane parallel to a major surface of a substrate 40 (i.e., x-y plane in FIG. 6A). Based on the scans of the rays 600 and 602, spatially-resolved OES data points may be obtained at the intersections of the rays 600 and 602 as illustrated in FIG. 6B, which may be used for estimating various plasma parameters and a 2D map may be generated (FIG. 6C).

In various embodiments, the OES measurements may be performed during processing a substrate with the plasma. Accordingly, the gas composition in the plasma processing chamber may be strictly controlled accordingly to a process recipe so that the OES measurements can be indeed non-intrusive. To this end, the methods of 2D/3D mapping of plasma parameters may use a trace rare gas-optical emission spectroscopy (TRG-OES) technique or similar. Because only a trace amount of a probe gas is added to the plasma in a TRG-OES technique, the plasma and thereby the plasma process conditions can advantageously remain unchanged.

In various embodiments, the probe gas may comprise a noble gas. In certain embodiments, the probe gas may comprise helium (He), neon (Ne), argon (Ar), krypton (Kr), or xenon (Xe). In other embodiments, the probe gas may comprise dinitrogen ($N_2$) or dihydrogen ($H_2$). The probe gas may also comprise a mixture of gases, for example, two or more noble gases. The use of more than one type of gas (i.e., probe gas mixture) may provide multiple emission lines to be measured and thereby advantageously improve the accuracy of plasma parameter determination.

To make the OES measurement non-intrusive, the probe gas is flowed to the plasma processing chamber at a flow rate negligible in view of the total process gas flow. In certain embodiments, the probe gas flow rate may be between 0.01% and 1% of a total gas flow rate of the process gas. In another embodiment, the probe gas flow rate may be between 1% and 2% of the total flow rate of the process gas. Although it may be desired to flow only a small amount of the probe gas to avoid any disturbance to the plasma in various embodiments, it may be possible to flow a greater amount (e.g., >1% of the total gas flow), especially when the process gas already comprise the same gas. For example, for various plasma processing, Ar, Kr, or $N_2$ may generally be included in the process gas mix as a diluent gas. Accordingly, in such embodiments, OES signals from the diluent gas may be used for plasma characterization, serving as the probe gas.

The composition of the probe gas may be selected in consideration of a plasma parameter of interest. For example, one or more noble gases may be used for parameters such as electron temperature, or electron energy distribution function. $N_2$ may be used for (neutral) gas temperature, and $H_2$ may be used for electrical field or fast neutral energy distribution in a plasma sheath region of the plasma. The spatially-resolved OES data points collected for the probe gas may be analyzed for signal intensity or features of spectrum (e.g., peak broadening) for estimating such plasma parameters. In certain embodiments, 2D/3D map of the plasma parameters may be obtained by following steps: (1) spatially-resolved OES data collection for the probe gas; (2) 2D/3D OES map construction for corresponding emission lines of the probe gas using a computation model; (3) spatially-resolved plasma parameters calculation based on 2D/3D OES map and data fitting with an OES model (e.g., simulated OES spectrum); and (4) 2D/3D plasma parameter map construction. Some exemplary procedures are described below.

In various embodiments, electron temperature ($T_e$) may be obtained, using the TRG-OES technique, from the OES signal intensity of a trace amount of noble gas (e.g., 0.01% to 1% of the total process gas flow). The optical emission line of $2p_x \rightarrow 1s_y$ (in Paschen notation) may be used. This measured OES signal intensity may be compared with a theoretical model. Using available cross sections for excitation out of both the ground state and metastable levels of the noble gases, The signal intensity (I) may be modeled as follows:

$$I_A = \alpha \left[ n_{A_{gs}} \int_{v_0, A_{gs}}^{\infty} \sigma_{A_{gs}}(v) v^3 f_e(v) dv + \sum_{i1}^{2} n_{A_{m_i}} \int_{0v, A_{m_i}}^{\infty} \sigma_{A_{m_i}}(v) v^3 f_e(v) dv \right]$$

where $\alpha$ is proportionality constant; $n_{A_{gs}}$, $n_{A_{m1}}$, and $n_{A_{m2}}$ are number density of rare gas A ground state, $1s_3$, or $1s_5$ metastable state; $\sigma(v)$ is cross section at electron speed v for electron impact excitation of $A_k$ from $A_i$; and $f_e(v)$ is electron distribution function. When a Maxwellian electron speed distribution is assumed, $f_e(v)$ can be expressed with electron temperature ($T_e$) as follows:

$$f_e(v) = n_e \left( \frac{m_e}{2\pi k T_e} \right)^{3/2} \exp\left( -\frac{m_e v^2}{2kT_e} \right)$$

Substituting $f_e(v)$ in the first equation above, the signal intensity can be expressed as a function of $T_e$. The measured OES signal intensity can be compared with this model and $T_e$ that provides the best match between the measured value and model may be determined.

In various embodiments, gas temperature may be obtained by data fitting for the measured OES spectrum obtained from a trace amount of $N_2$ (e.g., 0.01% to 1% of the total process gas flow) with a synthetic model spectrum. For a given gas temperature value (rotational temperature $T_r$), a theoretical spectrum may be first generated as follows by summation of line intensity (I) over all possible energy transitions:

$$I_{sim}(\lambda_i; T_r) =$$
$$\sum_{\Omega=0}^{2} \sum_{J''=J'-1}^{J'+1} \sum_{J'=J'min}^{J'max} I_{Gaus}(\lambda_i, \lambda_0, J', J'', \Omega; T_r)(\text{if } \lambda_o - 2w \le \lambda_i \le \lambda_o + 2w)$$

where J represents different rotational levels, $\Omega$ is the quantum number of the total electronic angular momentum, and $\lambda$ is wavelength of corresponding transition. Subsequently, based on this theoretical spectrum, a synthetic spectrum may then be developed by taking account effects of OES instrument resolution and signal to noise ratio. Using a computation algorithm, a temperature that provides the best fit between the synthetic and measured spectra may be obtained.

Further, based on spatially-resolved OES measurements, non-intrusive diagnostic of ion and fast neutral parameters in the plasma sheath region is also possible with time-resolved capability. The plasma properties that may be estimated in various embodiments include, time-resolved electrical field strength in the sheath, ion energy, fast neutral energy in the sheath. The technique may provide 1D information (in the direction normal to the major surface of the substrate) or 2D (in directions normal and parallel to the major surface of the substrate).

In various embodiments, electric field distribution in the sheath region of the plasma may be obtained by data fitting for the measured OES spectrum obtained from a trace amount of $H_2$ (e.g., 1% to 2% of the total process gas flow) with a synthetic model spectrum. The technique relies on the Stark splitting effect of the hydrogen Balmer lines, in which the fine energy levels of hydrogen atoms split in the presence of an electric field. For Hβ spectra with the transition from a higher energy level n' to a lower energy level n, the Stark splitting from the center of the spectral transition is given by:

$$\Delta v_k (\text{cm}^{-1}) = \Delta v(n', n'_1, n'_2) - \Delta v(n, n_1, n_2) = 6.420 \times 10^{-2} k\, E(\text{kV/cm})$$

where $k = n'(n'_1 - n'_2) - n(n_1 - n_2)$ is the Stark component number of the emission line. The synthetic spectrum can be generated by summation over all possible transitions including other broaden effects. The actual electric field strength can then be derived from the best fit between the synthetic and measured spectra by minimizing the $\chi^2$ as below:

$$\chi^2(E, \Delta E) = \sum_{i=1}^{n} \left( \frac{I_{abs}(\lambda_i) - I'_{sim,stark}(\lambda_i, \Delta \lambda_V; E, \Delta E)}{err(\lambda_i)} \right)^2$$

In various embodiments, energy distribution of fast neutral energy and relative intensity in the sheath region of the plasma may be obtained by data fitting for the measured OES spectrum obtained from a trace amount of $H_2$ (e.g., 1% to 2% of the total process gas flow) with a synthetic model spectrum. This technique relies on the Doppler broaden effect of the hydrogen Balmer lines, in which the line width of Hα and Hβ lines are affected by fast neutral temperatures. Doppler broadening results from the movement of emitting atoms relative to the observer, therefore the measurement need conduct in the direction of electrical field It yields a Gaussian profile at low pressure and is given by the expression:

$$\Delta \lambda_{Doppler} = 7.16 \times 10^{-7} \lambda \sqrt{\frac{T_h}{M}}$$

where $T_h$ is the temperature of the emitters and M the atomic weight in atomic mass units (amu). In the sheath region, further broadening of Hα and Hβ line is due to the difference in temperatures formed during the ion and neutral charge exchange process in sheath. A synthetic spectrum can be generated based on a two-temperature assumption while taking account other broadening effects. Ion and fast neutral energy in sheath region can be derived based on the best fit between the synthetic and measured spectra.

Figure 7A:
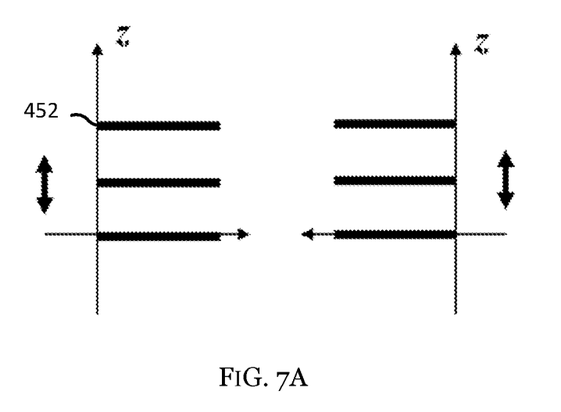
Figure 7B:
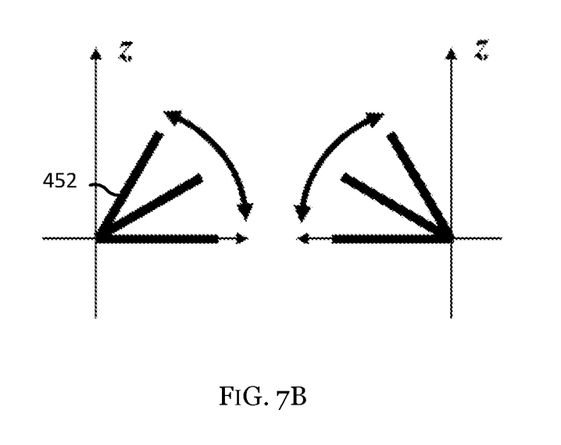
FIG. 7B illustrates a method of rotating of the two optical systems.

FIGS. 7A-7B illustrate two methods of three-dimensional (3D) plasma OES measurement using two optical systems.

Although the prior embodiments (e.g., FIGS. 6A-6C) describe the 2D mapping of OES and plasma parameters, in certain embodiments, the OES and plasma parameter mapping process may also be extended to three-dimensions (3D) by scanning the rays for OES measurements in 3D. In various embodiments, the 2D scans as previously described above may be repeated for different levels (e.g., at varying distance from the substrate) to collect a series of 2D maps to construct a 3D map.

In FIG. 7A, vertical shifting of two measurement heads 452 of optical systems to perform multiple parallel 2D scans is illustrated, where the movement of the two measurement heads 452 in z-direction (normal to the major surface of the substrate) is indicated by arrows. As illustrated, in various embodiments, each 2D scan may be performed parallel to the major surface of the substrate. To enable OES data collection at varying distance from the major surface of the substrate, a plasma processing chamber may have an optical window (e.g., the optical window 70 in FIGS. 1 and 2) with a sufficient height.

Alternately, as illustrated in FIG. 7B, the 3D scan may be enabled by rotating the two measurement heads 452 of optical systems instead of vertically shifting their positions. In these embodiments, the size of the optical window of the plasma processing chamber may advantageously be smaller compared to the prior embodiment with vertical shifting.

Figure 8A:
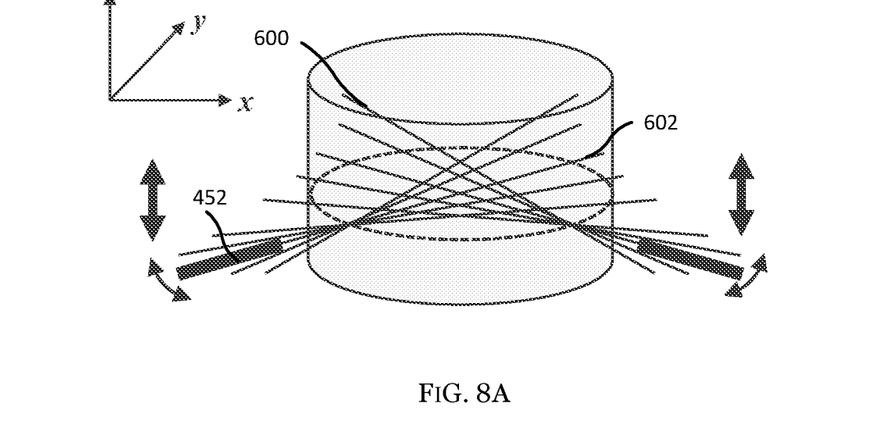
FIG. 8A illustrates OES scans using two optical systems.
Figure 8B:
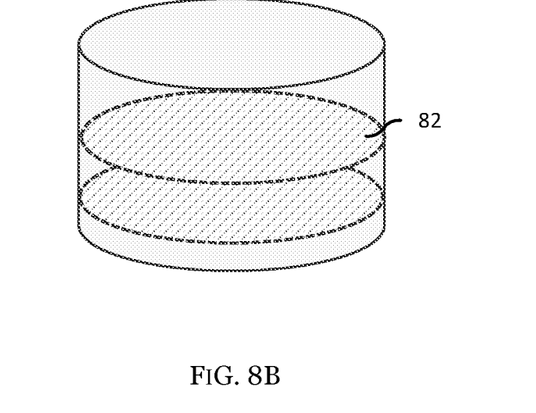
FIG. 8B illustrates spatially-resolved OES data points.
Figure 8C:
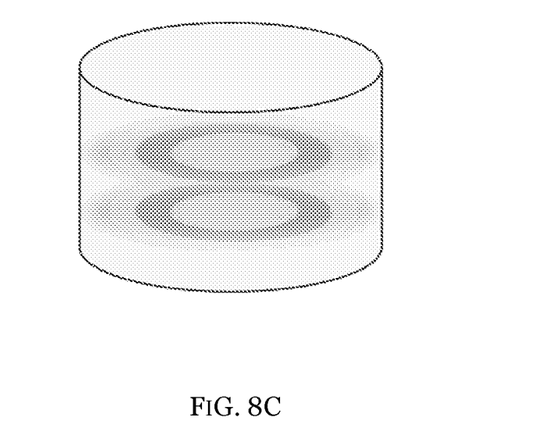
Figure 9A:
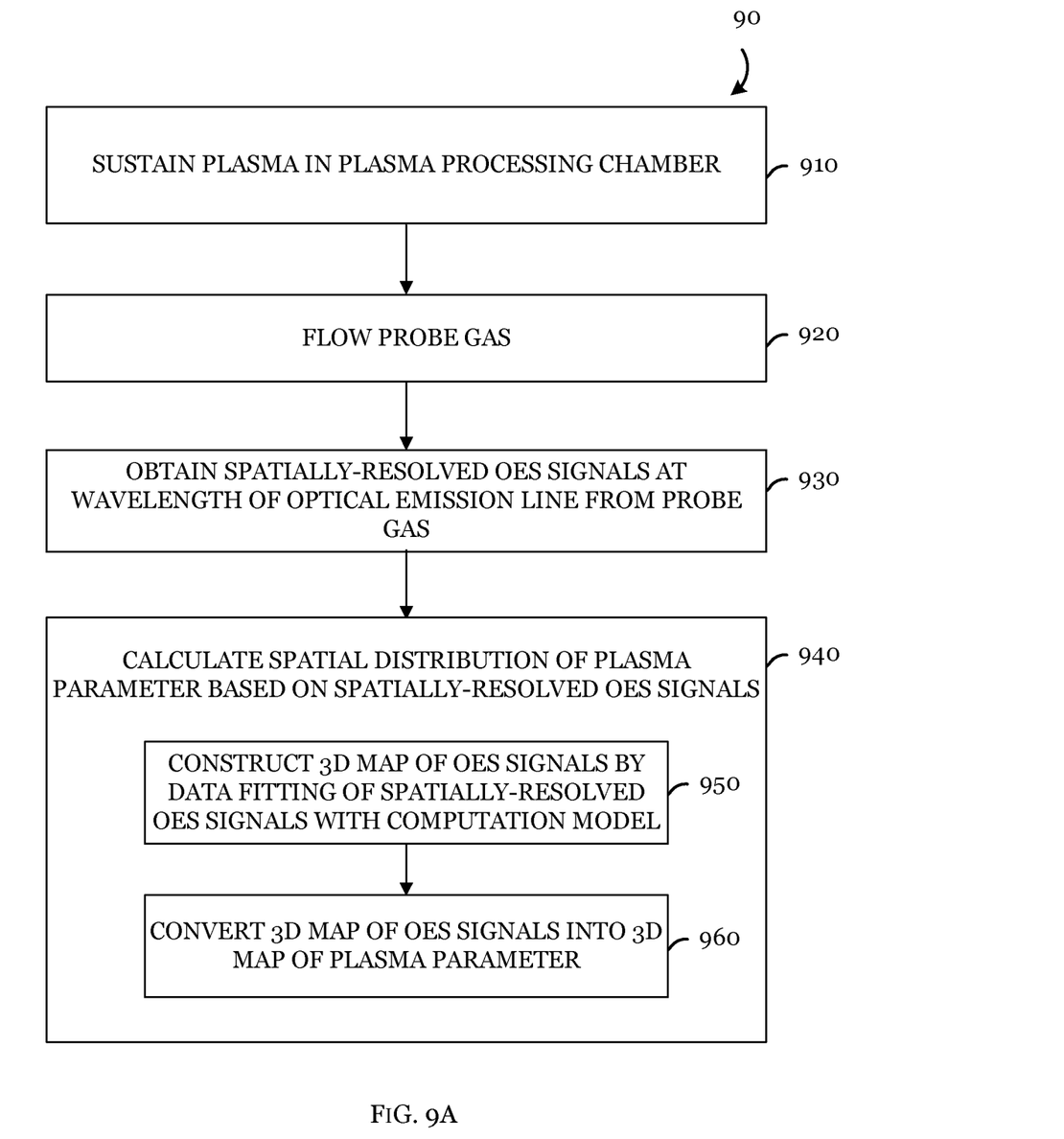
Figure 9B:
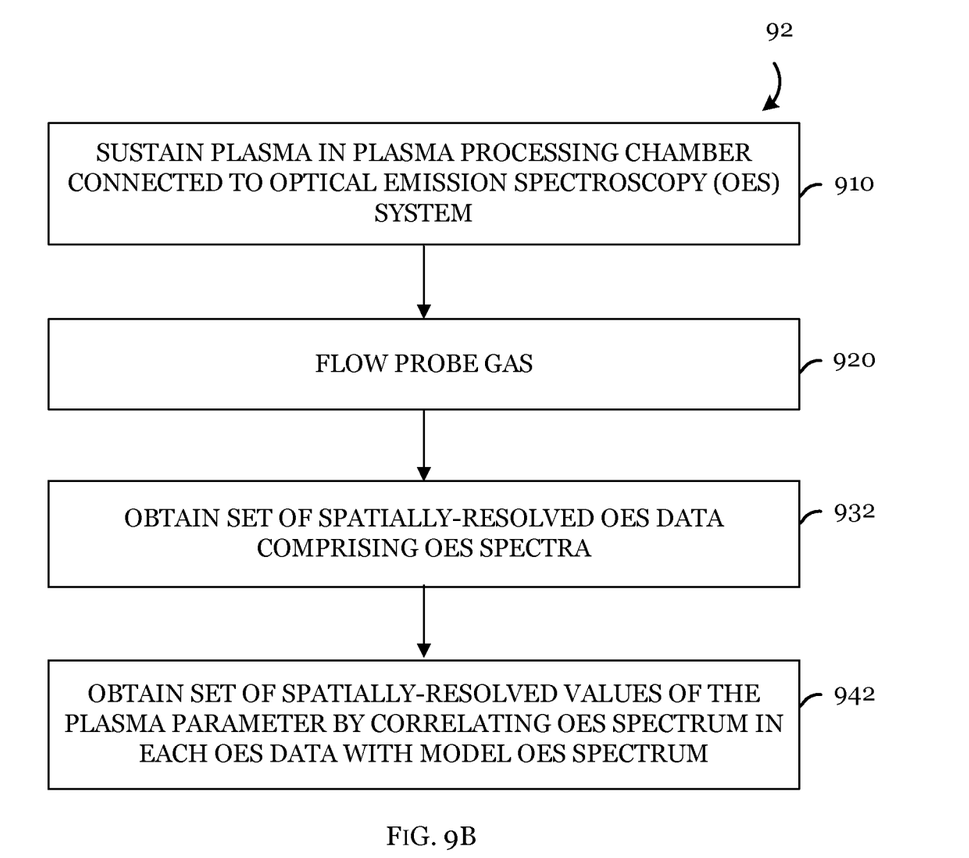
FIG. 9B illustrates another embodiment.
Figure 9C:
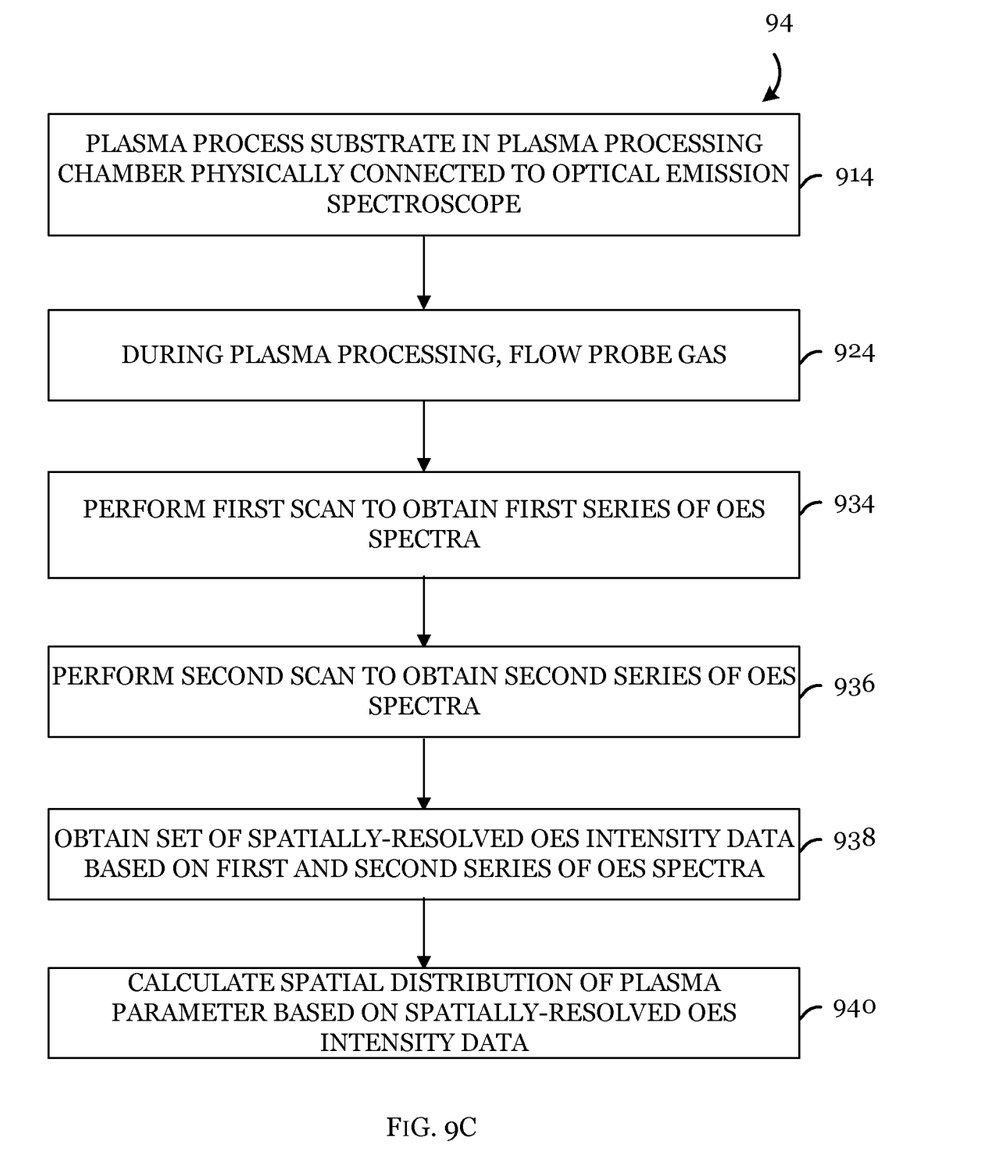
FIG. 9C illustrates yet another embodiment.

FIGS. 8A-8C illustrate perspective views of an example substrate at various stages of a 3D plasma parameter mapping process in accordance with various embodiments. FIG. 8A illustrates OES scans using two optical systems in 3D, FIG. 8B illustrates spatially-resolved OES data points in 3D, and FIG. 8C illustrates a 3D map of a plasma parameter.

In FIG. 8A, two measurement heads 452 may be scanned to sweep out rays 600 and 602 such that intersections of the rays are distributed in 3D (i.e., in x-y-z space), as opposed to only a single x-y plane as previously illustrated in FIG. 6A. Spatially-resolved OES data points may be then obtained at the intersections of the rays 600 and 602 (FIG. 8B). For illustration purpose, two planes 82 of OES data that may be obtained from two sets of 2D scans in FIG. 8B. This spatially-resolved OES data may then be converted to one or more plasma parameters as described above, and a 3D map may be constructed (FIG. 8C).

As described above in various embodiments, the methods of spatially-resolved OES measurement enables time-resolved 2D/3D mapping of various plasma parameters (e.g., electron temperature). This monitored information can then be used for dynamically controlling the plasma conditions during a plasma process such as reactive ion etching (RIE). In one embodiment, based on the 2D/3D map of one or more plasma parameters, a process parameter of the process (e.g., plasma power source, process time, gas flow rates, and pressure) may be changed. In another embodiment, the information may be used for endpoint detection of a process. In addition to the in-situ plasma process monitoring, the 2D/3D map may also be used for other applications such as plasma processing tool development and plasma process fault detection.

FIGS. 9A-9C illustrate process flow charts of methods of plasma parameter mapping process with spatially-resolved OES measurements in accordance with various embodiments. The process flow can be followed with the figures (e.g., FIGS. 6A-6C) discussed above and hence will not be described again.

In FIG. 9A, a process flow 90 starts with sustaining a plasma generated from a process gas in a plasma processing chamber, the plasma processing chamber connected a plasma optical emission spectroscopy (OES) system (block 910), followed by flowing a probe gas to the plasma processing chamber (block 920). Spatially-resolved OES signals may then be obtained at a wavelength of an optical emission line from the probe gas (block 930, FIGS. 6A-6B). Based on the spatially-resolved OES signals, a spatial distribution of the plasma parameter within the plasma processing chamber may be calculated (block 940, FIG. 6C). In certain embodiments, calculating the spatial distribution of the plasma parameter comprises, based on the spatially-resolved OES signals, constructing three-dimensional (3D) map of OES signals by data fitting of the spatially-resolved OES signals with a computation model (block 950), followed by converting the 3D map of OES signals into a 3D map of the plasma parameter (block 960).

In FIG. 9B, another process flow 92 starts with sustaining a plasma generated from a process gas in a plasma processing chamber, the plasma processing chamber connected a plasma OES system (block 910), followed by flowing a probe gas to the plasma processing chamber (block 920). A set of spatially-resolved OES data from the plasma may then be obtained using the plasma OES system, where each OES data comprises an OES spectrum of the probe gas (block 932, FIGS. 6A-6B). Subsequently, a set of spatially-resolved values of the plasma parameter that correspond to the set of spatially-resolved OES data may be obtained by correlating the OES spectrum in each OES data with a model OES spectrum (block 942, FIG. 6C).

In FIG. 9C, yet another process flow 94 starts with plasma processing a substrate in a plasma processing chamber by exposing the substrate to a plasma generated from a process gas (block 914). During the plasma processing, a probe gas may be flowed to the plasma processing chamber (block 924). Using a first OES collection system, a first scan may be performed across the plasma processing chamber to obtain a first series of OES spectra from a first series of rays that concentrically share a first pivot point (block 934, FIG. 6A). Using a second OES collection system, a second scan may be performed across the plasma processing chamber to obtain a second series of OES spectra from a second series of rays that concentrically share a second pivot point (block 936, FIG. 6A). Based on the first and second series of OES spectra, a set of spatially-resolved OES intensity data may be obtained from an optical emission line of the probe gas in the plasma (block 938, FIG. 6B). Based on the set of spatially-resolved OES intensity data, a spatial distribution of the plasma parameter within the plasma processing chamber may then be calculated (block 940, FIG. 6C).

Example embodiments of the invention are described below. Other embodiments can also be understood from the entirety of the specification as well as the claims filed herein.

Example 1. A method of characterizing a plasma in a plasma processing chamber that includes: sustaining a plasma generated from a process gas in a plasma processing chamber of a plasma processing system, the plasma processing including a plasma optical emission spectroscopy (OES) system configured to measure optical emissions from the plasma, the plasma processing chamber configured to hold and plasma process a substrate; flowing a probe gas through the plasma processing chamber; obtaining spatially-resolved OES signals at a wavelength of an optical emission line of the probe gas within the plasma processing chamber, signal intensities of the spatially-resolved OES signals being correlated to a plasma parameter of the plasma, the plasma parameter having a spatial distribution within the plasma processing chamber; and based on the spatially-resolved OES signals, constructing a three-dimensional (3D) map of OES signals by data fitting of the spatially-resolved OES signals with a computation model; and converting the 3D map of OES signals into a 3D map of the plasma parameter, the 3D map of the plasma parameter including information about the spatial distribution.

Example 2. The method of example 1, where the probe gas includes neon (Ne), argon (Ar), krypton (Kr), or xenon (Xe), and where the probe gas is flowed to the plasma processing chamber at a flow rate between 0.01% and 1% of a total gas flow rate of the process gas.

Example 3. The method of one of examples 1 or 2, where obtaining the spatially-resolved OES signals from the plasma includes: defining a first plane within the plasma processing chamber, the first plane intersecting with the plasma; collecting a first series of OES signals at a first optical port of the plasma processing chamber, the first series of OES signals corresponding to a first series of rays that concentrically share a first pivot point, the first series of rays being on the first plane; collecting a second series of OES signals at a second optical port of the plasma processing chamber, the second series of OES signals corresponding to a second series of rays that concentrically share a second pivot point; based on the first and second series of OES signals, computing the spatially-resolved OES signal at intersections of the first and second series of rays.

Example 4. The method of one of examples 1 to 3, where collecting the first series of OES signals includes rotating a first signal collection angle at the first pivot point, and where collecting the second series of OES signals includes rotating a second signal collection angle at the second pivot point.

Example 5. The method of one of examples 1 to 4, where the second series of rays is on the first plane.

Example 6. The method of one of examples 1 to 5, further including temporally monitoring the 3D map of the plasma parameter by repeating the steps of obtaining spatially-resolved OES signals, constructing the 3D map of OES signals, and converting the 3D map of OES signals into the 3D map of the plasma parameter.

Example 7. A method of characterizing a plasma in a plasma processing chamber that includes: sustaining a plasma generated from a process gas in a plasma processing chamber, the plasma processing chamber connected a plasma optical emission spectroscopy (OES) system, the plasma processing chamber configured to hold and plasma process a substrate; flowing a probe gas to the plasma processing chamber; obtaining a set of spatially-resolved OES data from the plasma using the plasma OES system, each OES data including an OES spectrum of the probe gas, the OES spectrum correlated to a plasma parameter of the plasma; obtaining a set of spatially-resolved values of the plasma parameter that correspond to the set of spatially-resolved OES data, the obtaining of the set of spatially-resolved values of the plasma parameter including correlating the OES spectrum in each OES data with a model OES spectrum.

Example 8. The method of example 7, where the probe gas is flowed at a flow rate between 0.01% and 1% of a total gas flow rate of the process gas.

Example 9. The method of one of examples 7 or 8, where the plasma parameter is electron temperature, gas temperature, electrical field energy distribution, or fast neutral energy distribution.

Example 10. The method of one of examples 7 to 9, where the probe gas includes a noble gas, and where the plasma parameter is electron temperature.

Example 11. The method of one of examples 7 to 9, where the probe gas includes dinitrogen (N2), and where the plasma parameter is gas temperature.

Example 12. The method of one of examples 7 to 9, where the probe gas includes dihydrogen ($H_2$), where the OES spectrum includes hydrogen Balmer lines, where the probe gas is flowed at a flow rate between 1% and 2% of a total gas flow rate of the process gas, and where the plasma parameter is electrical field or fast neutral energy distribution in a plasma sheath region of the plasma.

Example 13. The method of one of examples 7 to 9, where the probe gas includes dihydrogen ($H_2$), and where the model OES spectrum accounts for Stark splitting effect or Doppler broaden effect of the hydrogen Balmer lines.

Example 14. The method of one of examples 7 to 13, further including based on the set of spatially-resolved values of the plasma parameter, constructing a three-dimensional (3D) map of the plasma parameter by data fitting of the set of spatially-resolved values of the plasma parameter with another computation model.

Example 15. The method of one of examples 7 to 14, further including temporally monitoring the set of spatially-resolved values of the plasma parameter by repeating the steps of obtaining the set of spatially-resolved OES data, performing the data fitting, and obtaining the set of spatially-resolved values of the plasma parameter.

Example 16. The method of one of examples 7 to 15, where obtaining the set of spatially-resolved values of the plasma parameter includes deriving the model OES spectrum from a theoretical spectrum by adding a synthetic noise spectrum and a Gaussian function that accounts for peak broadening to the theoretical spectrum.

Example 17. A method of processing a substrate, the method including: plasma processing a substrate in a plasma processing chamber by exposing the substrate to a plasma generated from a process gas, the plasma processing chamber being mechanically connected to a plasma optical emission spectroscope (OES); during the plasma processing, flowing a probe gas through the plasma processing chamber; performing a first scan across the plasma processing chamber to obtain a first series of OES spectra from a first series of rays that concentrically share a first pivot point; performing a second scan across the plasma processing chamber to obtain a second series of OES spectra from a second series of rays that concentrically share a second pivot point; based on the first and second series of OES spectra, obtaining a set of spatially-resolved OES intensity data from an optical emission line of the probe gas in the plasma, the OES intensity data correlated to a plasma parameter of the plasma; and based on the set of spatially-resolved OES intensity data, calculating a spatial distribution of the plasma parameter within the plasma processing chamber.

Example 18. The method of example 17, further including, based on the spatial distribution of the plasma parameter, changing a process parameter for the plasma processing during the plasma processing.

Example 19. The method of one of examples 17 or 18, further including repeating the steps of the first scan, the second scan, and obtaining the set of spatially-resolved OES intensity data, on another plane parallel to the major surface of the substrate and a second distance from the major surface, where the spatial distribution of the plasma parameter includes a three-dimensional (3D) map of the plasma parameter.

Example 20. The method of one of examples 17 to 19, further including, performing an endpoint detection of the plasma processing by monitoring the spatial distribution of the plasma parameter during processing the substrate, the monitoring including repeating the steps of the first scan, the second scan, obtaining the set of spatially-resolved OES intensity data, and estimating calculating the spatial distribution of the plasma parameter.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of characterizing plasma in a plasma processing chamber, the method comprising:
sustaining a plasma generated from a process gas in the plasma processing chamber of a plasma processing system, the plasma processing system comprising a plasma optical emission spectroscopy (OES) system configured to measure optical emissions from the plasma, the plasma processing chamber configured to hold and plasma process a substrate;
flowing a probe gas through the plasma processing chamber, the probe gas being different from the process gas;
obtaining spatially-resolved OES signals at a wavelength of an optical emission line of the probe gas within the plasma processing chamber, signal intensities of the spatially-resolved OES signals being correlated to a plasma parameter of the plasma, the plasma parameter having a three-dimensional (3D) spatial distribution within the plasma processing chamber;
based on the spatially-resolved OES signals, constructing 3D map of OES signals by data fitting of the spatially-resolved OES signals with a computation model; and
converting the 3D map of OES signals into a 3D map of the plasma parameter, the 3D map of the plasma parameter comprising information about the 3D spatial distribution of the plasma parameter.

2. The method of claim 1, wherein the probe gas comprises neon (Ne), argon (Ar), krypton (Kr), or xenon (Xe), and wherein the probe gas is flowed to the plasma processing chamber at a flow rate between 0.01% and 1% of a total gas flow rate of the process gas.

3. The method of claim 1, further comprising temporally monitoring the 3D map of the plasma parameter by repeating the steps of obtaining spatially-resolved OES signals, constructing the 3D map of OES signals, and converting the 3D map of OES signals into the 3D map of the plasma parameter.

4. A method of characterizing plasma in a plasma processing chamber, the method comprising:
sustaining a plasma generated from a process gas in the plasma processing chamber, the plasma processing chamber being connected to a plasma optical emission spectroscopy (OES) system, the plasma processing chamber being configured to hold and plasma process a substrate;
flowing a probe gas to the plasma processing chamber, the probe gas being different from the process gas;
obtaining a set of three-dimensional (3D) spatially-resolved OES data from the plasma using the plasma OES system, each OES data comprising an OES spectrum of the probe gas, the OES spectrum being correlated to a plasma parameter of the plasma; and
obtaining a set of 3D spatially-resolved values of the plasma parameter that correspond to the set of 3D spatially-resolved OES data, the obtaining of the set of 3D spatially-resolved values of the plasma parameter comprising correlating the OES spectrum in each OES data with a model OES spectrum.

5. The method of claim 4, wherein the probe gas is flowed at a flow rate between 0.01% and 1% of a total gas flow rate of the process gas.

6. The method of claim 4, wherein the plasma parameter is process gas temperature.

7. The method of claim 4, wherein the probe gas comprises a noble gas, and wherein the plasma parameter is electron temperature.

8. The method of claim 4, wherein the probe gas comprises dinitrogen ($N_2$), and wherein the plasma parameter is process gas temperature obtained by data fitting using the OES data of the probe gas.

9. The method of claim 4, wherein the probe gas comprises dihydrogen ($H_2$), wherein the OES spectrum comprises hydrogen Balmer lines, wherein the probe gas is flowed at a flow rate between 1% and 2% of a total gas flow rate of the process gas, and wherein the plasma parameter is electrical field or fast neutral energy distribution in a plasma sheath region of the plasma.

10. The method of claim 4, wherein the probe gas comprises dihydrogen ($H_2$), and wherein the model OES spectrum accounts for Stark splitting effect or Doppler broaden effect of hydrogen Balmer lines.

11. The method of claim 4, further comprising based on the set of spatially-resolved values of the plasma parameter, constructing a three-dimensional (3D) map of the plasma parameter by data fitting of the set of spatially-resolved values of the plasma parameter with another computation model.

12. The method of claim 4, further comprising temporally monitoring the set of spatially-resolved values of the plasma parameter by repeating the steps of obtaining the set of spatially-resolved OES data, performing the data fitting, and obtaining the set of spatially-resolved values of the plasma parameter.

13. The method of claim 4, wherein obtaining the set of spatially-resolved values of the plasma parameter comprises deriving the model OES spectrum from a theoretical spectrum by adding a synthetic noise spectrum and a Gaussian function that accounts for peak broadening to the theoretical spectrum.

14. The method of claim 4, wherein the plasma parameter is electron temperature.

15. The method of claim 4, wherein the plasma parameter is electrical field energy distribution.

16. The method of claim 4, wherein the plasma parameter is fast neutral energy distribution.

17. A method of processing a substrate, the method comprising:
    plasma processing the substrate in a plasma processing chamber by exposing the substrate to a plasma generated from a process gas, the plasma processing chamber being mechanically connected to a plasma optical emission spectroscope (OES);
    during the plasma processing, flowing a probe gas through the plasma processing chamber, the probe gas being different from the process gas;
    performing a first scan across the plasma processing chamber in a first plane having a constant first vertical parameter to obtain a first series of OES spectra from a first series of rays that concentrically share a first pivot point;
    performing a second scan across the plasma processing chamber in the first plane to obtain a second series of OES spectra from a second series of rays that concentrically share a second pivot point;
    repeating the first scan and the second scan in one or more second planes having respective constant second vertical parameters to obtain one or more additional pairs of first and second series of OES spectra;
    based on the first and second series of OES spectra including the additional pairs of first and second series of OES spectra, obtaining a set of three-dimensional (3D) spatially-resolved OES intensity data from an optical emission line of the probe gas in the plasma, the OES intensity data correlated to a plasma parameter of the plasma; and
    based on the set of 3D spatially-resolved OES intensity data, calculating a 3D spatial distribution of the plasma parameter within the plasma processing chamber.

18. The method of claim 17, further comprising, based on the 3D spatial distribution of the plasma parameter, changing a process parameter for the plasma processing during the plasma processing.

19. The method of claim 17, wherein the constant first vertical parameter is a constant z-axis value, the first plane being a plane parallel to a major surface of the substrate, wherein the constant second vertical parameters are different constant z-axis values defining additional planes, each of the additional planes being a respective second distance from the major surface.

20. The method of claim 17, further comprising, performing an endpoint detection of the plasma processing by monitoring the 3D spatial distribution of the plasma parameter during processing the substrate, the monitoring comprising repeating the steps of the first scan, the second scan, obtaining the set of 3D spatially-resolved OES intensity data, and calculating the 3D spatial distribution of the plasma parameter.

* * * * *